(12) United States Patent
Backhouse et al.

(10) Patent No.: US 11,506,164 B2
(45) Date of Patent: Nov. 22, 2022

(54) CONTROL VALVE ASSEMBLY AND METHOD OF MANUFACTURING THEREOF

(71) Applicant: DELPHI TECHNOLOGIES IP LIMITED, St. Michael (BB)

(72) Inventors: Simon Backhouse, Gloucester (GB); George A. Meek, Aylburton (GB)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 535 days.

(21) Appl. No.: 16/482,143

(22) PCT Filed: Jan. 29, 2018

(86) PCT No.: PCT/EP2018/052176
§ 371 (c)(1),
(2) Date: Jul. 30, 2019

(87) PCT Pub. No.: WO2018/138365
PCT Pub. Date: Aug. 2, 2018

(65) Prior Publication Data
US 2020/0003171 A1 Jan. 2, 2020

(30) Foreign Application Priority Data

Jan. 30, 2017 (GB) ..................... 1701454

(51) Int. Cl.
*F02M 63/00* (2006.01)
*F02M 47/02* (2006.01)
*F02M 51/06* (2006.01)
*B23P 15/00* (2006.01)

(52) U.S. Cl.
CPC ....... *F02M 63/0064* (2013.01); *B23P 15/001* (2013.01); *F02M 47/027* (2013.01); *F02M 51/0625* (2013.01); *F02M 63/004* (2013.01); *F02M 2200/46* (2013.01); *F02M 2200/8061* (2013.01); *F02M 2200/8069* (2013.01); *F02M 2200/8092* (2013.01)

(58) Field of Classification Search
CPC ...... F02M 63/004; F02M 61/06; F02M 43/04; F02M 2200/44; F02M 2200/46; F02M 63/0049; F02M 63/008; F02M 63/0064; F02D 41/401
See application file for complete search history.

(56) References Cited

U.S. PATENT DOCUMENTS 4,421,280 A * 12/1983 Lewis ................ F02M 51/0671
239/132.5
4,978,074 A * 12/1990 Weinand ................ F02M 67/12
251/129.18
(Continued)

FOREIGN PATENT DOCUMENTS

WO 2016058825 A1 4/2016

*Primary Examiner* — Tuongminh N Pham
(74) *Attorney, Agent, or Firm* — Warner Norcross + Judd LLP (57) ABSTRACT

A control valve assembly of a fuel injector includes a first valve arrangement wherein a first valve spool is guided in a first hydraulic bore provided in a body of the assembly. The control assembly further includes a first tubular sleeve having a seating portion which end face defines the first seating face, the first sleeve being fixed in the first hydraulic bore and the first spool extending through the sleeve.

18 Claims, 3 Drawing Sheets

(56) References Cited

U.S. PATENT DOCUMENTS

| | | | |
|---|---|---|---|
| 6,260,776 B1 * | 7/2001 | Popp | F02M 47/046 |
| | | | 239/533.6 |
| 9,714,633 B2 | 7/2017 | Enters et al. | |
| 2002/0070295 A1 * | 6/2002 | Baker | F02M 47/06 |
| | | | 239/533.3 |
| 2004/0227018 A1 | 11/2004 | Seelbach | |
| 2005/0065119 A1 | 3/2005 | Couturier et al. | |
| 2005/0098144 A1 | 5/2005 | Stewart et al. | |
| 2006/0000930 A1 | 1/2006 | Ricco et al. | |
| 2007/0246561 A1 * | 10/2007 | Gibson | F02M 47/027 |
| | | | 239/443 |
| 2008/0116405 A1 | 5/2008 | Bolbolan | |
| 2014/0054396 A1 | 2/2014 | Scull | |
| 2015/0167609 A1 * | 6/2015 | Harcombe | F02M 61/042 |
| | | | 239/533.2 |

* cited by examiner

CONTROL VALVE ASSEMBLY AND METHOD OF MANUFACTURING THEREOF

CROSS REFERENCE TO RELATED APPLICATIONS

This application is a national stage application under 35 USC 371 of PCT Application No. PCT/EP2018/052176 having an international filing date of Jan. 29, 2018, which is designated in the United States and which claimed the benefit of GB Patent Application No. 1701454.9 filed on Jan. 30, 2017, the entire disclosures of each are hereby incorporated by reference in their entirety.

TECHNICAL FIELD

The present invention relates to a control valve assembly of a fuel injector and to the manufacturing of a precision valve lift.

BACKGROUND OF THE INVENTION

Fuel injectors comprise a control valve assembly for varying the pressure in a control chamber and commanding the moves of a needle valve member enabling or preventing injection events. In said control valve assembly a valve spool slides within a bore of a valve body to alternatively open and close a spill orifice.

The maximum valve lift, which is to be adjusted within a dimensional tolerance of few micrometers, is set by taking measurements of the spool head height and, adjusting the valve lift to the desired value by adding shim of appropriate thickness. Another effective way of achieving an accurate lift is to use selective assembly methods wherein the components are manufactured and sorted in families prior to be paired with other components to form valve assemblies. Although being efficient, such a process is not desired for the valve arrangement and production environment, the problem being to ensure that the correct distribution of parts is manufactured to cover the variability of the combinations of components. A large selection of parts may remain unused or, issues may arise where the right distribution of parts is not available to achieve the correct combination.

Some injectors are designed with two valve arrangements, each comprising a spool sliding in a bore between closed and open positions. The problem of having the correct valve lift for both is amplified with such control valve assemblies. Due to process variability it is unlikely that all valve heads will be the same, so to achieve equal lifts is a major problem however the challenge remains the same where different lifts are required for each valve.

SUMMARY OF THE INVENTION

Accordingly, it is an object of the present invention to resolve the above mentioned problems in providing a control valve assembly of a fuel injector, said valve assembly comprising a first valve arrangement wherein a first valve spool is guided in a first hydraulic bore provided in a body (18) of the assembly, said spool being adapted to move between a closed position wherein a shoulder face of a head member of said first spool is in sealing contact against a first seating face and, a fully open position wherein a distant end face of said head member is in flush continuity with an under face of the body of the valve assembly, the shoulder face of the first spool being lifted away from said first seating face.

Advantageously, the control valve assembly further comprises a first tubular sleeve having a seating portion which end face defines said first seating face, the first sleeve being fixed in the first hydraulic bore and the first spool extending through said sleeve.

Also, the first sleeve further comprises a spool guiding portion integral to the press-fitted seating portion, said guiding portion being arranged inside the hydraulic bore.

Also, said spool guiding portion has an inner guiding face against which, in use, slides the spool and, externally an outer face distant from the bore by an outer annular clearance.

Also, the seating portion is press-fitted in the bore and, it has an inner face defining an inner clearance with the spool.

The control valve further comprises a second valve arrangement, similar to the first valve arrangement, wherein a second spool is guided in a second hydraulic bore provided in the body of the assembly, said second spool being adapted to move between a closed position wherein a shoulder face of a head member of said second spool is in sealing contact against a second seating face and, a fully open position wherein a distant end face of said second head member is in flush continuity with an under face of the body of the valve assembly, the shoulder face of the second spool being lifted from said second seating face.

The control valve assembly further comprises a second tubular sleeve having a second seating portion defining said second seating face, said second sleeve being fixed in the second hydraulic bore, the second spool extending through said second sleeve.

Also, the second sleeve has an outer face press fitted in the second bore (34) and, an inner face defining a second clearance with the second spool.

Also, the body of the valve assembly comprises a valve guide member provided with the hydraulic bore and, a valve plate having an upper face and an opposed under face, the upper face being arranged in surface abutment against an under face of the valve guide member, said valve plate being further provided with a through opening aligned with the hydraulic bore, the sleeve being fixed in the valve guide member so that the seating face lies parallel and in close vicinity to the under face of the valve guide member, either slightly recessed inside the hydraulic bore or slightly protruding in the opening.

More precisely, the second hydraulic bore is defined in the valve guide member and, the valve plate is provided with a second through opening aligned with the second hydraulic bore, the second sleeve being press fitted in the valve guide member so that the second seating face lies parallel and in close vicinity to the under face of the valve guide member, either slightly recessed inside the second hydraulic bore or slightly protruding in the second opening.

Also, between the closed position and the fully open position, the first spool has a maximum lift calculated as per the formula:

$$L44=(T22+D40)-H48 \text{ wherein}$$

T22 is the thickness of the valve plate,
D40 is the offset distance from the first seating face to the valve guide under face and,
H48 is the height of the head of the first spool.

Also, between the closed position and the fully open position, the second spool has a maximum lift calculated as per the formula:

$$L54=(T22+D42)-H58 \text{ wherein}$$

T22 is the thickness of the valve plate,

D42 is the distance from the first seating face to the valve guide under face and, H58 is the height of the head of the second spool.

The invention further extends to a fuel injector comprising a control valve assembly as previously described.

The invention further extends to a method of manufacturing a control valve assembly as previously described, the method particularly enabling to ensure a precised valve lift measured between the closed position and the fully open position of the valve arrangement, the method comprising the steps of:

provide a valve body defining a hydraulic bore;
providing a valve spool having a head member joining a core via a shoulder face;
providing a sleeve adapted to be inserted in said bore, said sleeve defining a valve seating face;
engaging and inserting with press fit said sleeve in said bore so that the seating face is in close vicinity to the under face of the valve body;
arranging the valve spool so that the core extends in the sleeve and the head member is outside the sleeve, the shoulder face being able to cooperate with the valve seating face;
adjusting the position of the sleeve to the desired maximum lift of the spool.

Should the control valve assembly be provided with a second valve arrangement, the steps of the method are:

providing a valve body defining a first and a second hydraulic bore;
providing a first valve spool having a head member joining a core via a shoulder face and, a second spool having a head member joining a core via a shoulder face;
providing a first sleeve adapted to be inserted in said first bore and adapted to slidably receive the core of the first spool, the first sleeve defining a first valve seating face and, a second sleeve adapted to be inserted in said second bore and, adapted to slidably receive the core of the second spool, the second sleeve defining a second valve seating face;
engaging and inserting with press-fit said first sleeve in said first bore and, said second sleeve in said second bore;
slidably engaging the core of the first spool in the first sleeve, the first head member protruding outside the first sleeve and, the core of the second spool in the second sleeve, the second head member protruding outside the second sleeve;
adjusting the axial position of the first sleeve in the first bore to the desired first maximum lift of the first spool and, adjusting the axial position of the second sleeve in the second bore to the desired second maximum lift of the second spool.

Should the control valve body be provided with a valve guide member and a valve plate, the providing step is:

providing the valve guide member provided with a two hydraulic bore and a valve plate provided with two openings complementary aligned to said bores.
measuring the thickness of the valve plate, this measure being done after providing said valve plate.
measuring the height of each of the spool heads, this measure being done after the providing step.

The method further comprises the step:

surfacing together the valve guide under face and the two sleeves so that the bottom ends of said sleeves, each defining the seating faces, are exactly flush in surface continuity with the valve guide under face.

Said surfacing step may be a grinding operation.

The adjusting step comprises:

selecting the maximum lift possible for each of the first and second spool;
fine positioning each sleeve in order to offset the valve seating face from the guide member under face (30) by a distance:

$D40=L44+H48-T22$ for the first sleeve and, $D42=L54+H58-T22$ for the second sleeve wherein:

D40 and D42 are the axial offset distance from the valve guide member under face to the first, respectively the second, seating face, H48 and H58 are the head height of the first and second spool and, T22 is the thickness of the valve plate.

BRIEF DESCRIPTION OF THE DRAWINGS

The present invention is now described by way of example with reference to the accompanying drawings in which.

DESCRIPTION OF THE PREFERRED EMBODIMENTS

To inject fuel in a cylinder of an internal combustion engine, a fuel injector 10 is provided with a control valve assembly 12 arranged between an actuator member and a nozzle assembly, all said parts being firmly maintained together by a capnut. The control valve assembly 12 enables to vary the pressure in a control chamber such that, a needle valve sliding in the nozzle moves to open or to close spray holes and thus enables or forbids injection events.

Figure 1:
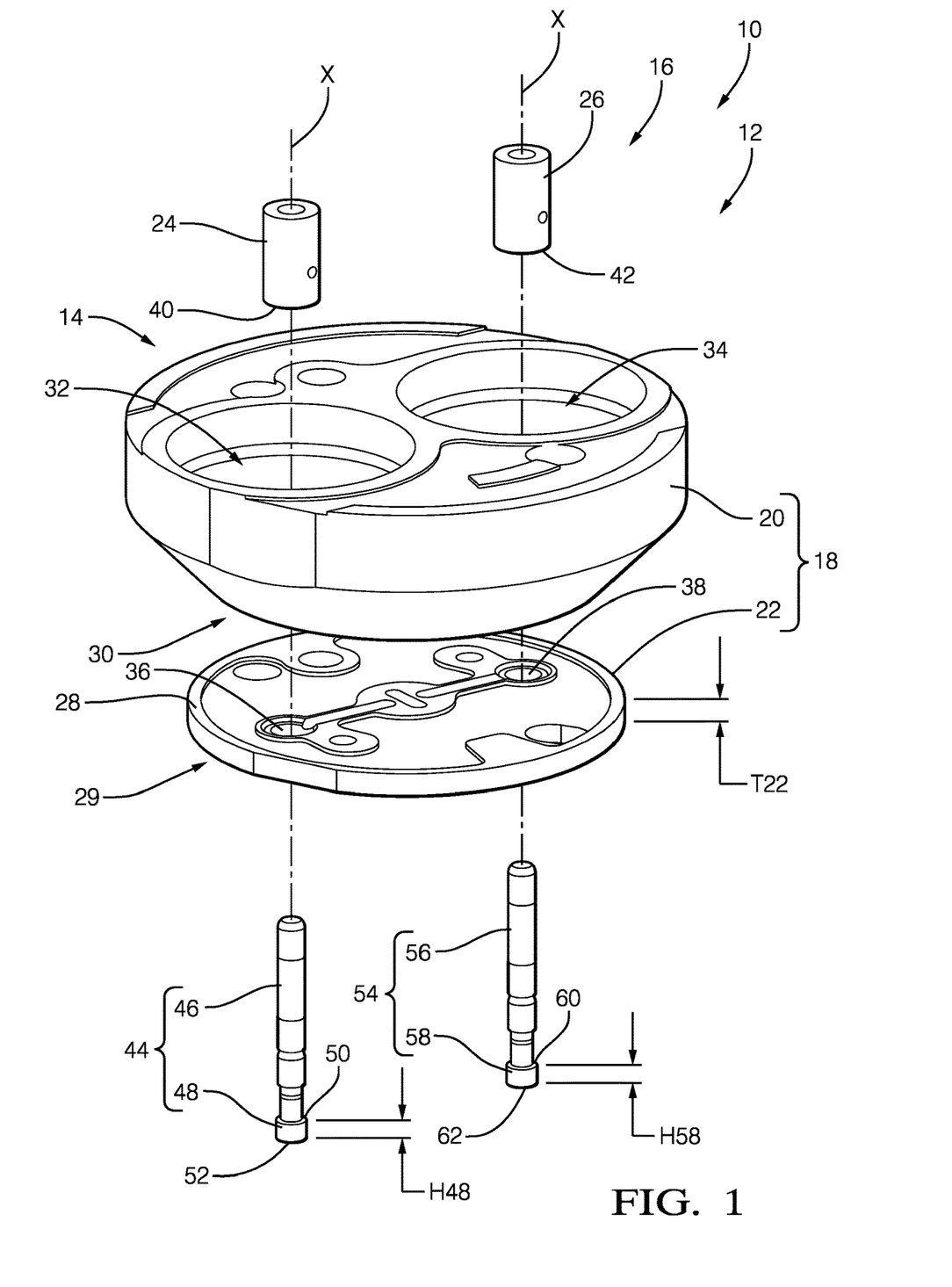
FIG. 1 is an exploded view of a control valve assembly as per the invention.

The described example of control valve assembly 12 shown on FIG. 1 is taken from a diesel fuel injector 10 and, it comprises a first 14 and a second 16 valve arrangement cooperating together for enabling pressurised fuel to enter the control chamber and then, for preventing said entry when the fuel therein is expelled toward a low pressure tank.

The first 14 and second 16 valve arrangements are similar, each comprising a hydraulic bore 32, 34 defining a seating face 40, 42 cooperating with a shoulder face 50, 60 defined on a valve spool 44, 54 slidably arranged in the bore. The spool comprises a thin and elongated core 46, 56 enlarging at an end to form a larger valve head 48, 58 defining said seat face.

Figure 2:
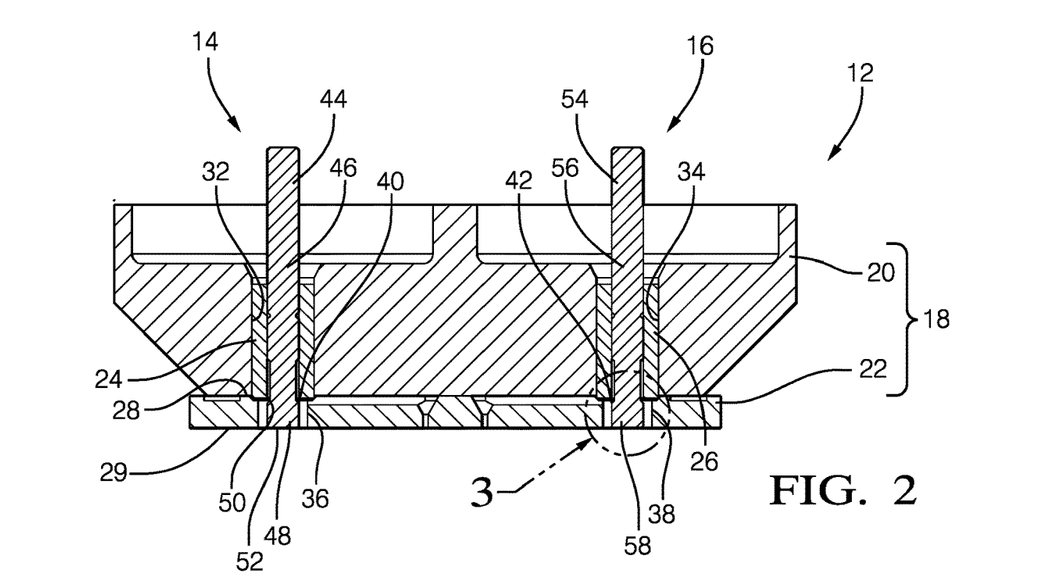
FIG. 2 is an axial section of the valve assembly of FIG. 1.
Figure 3:
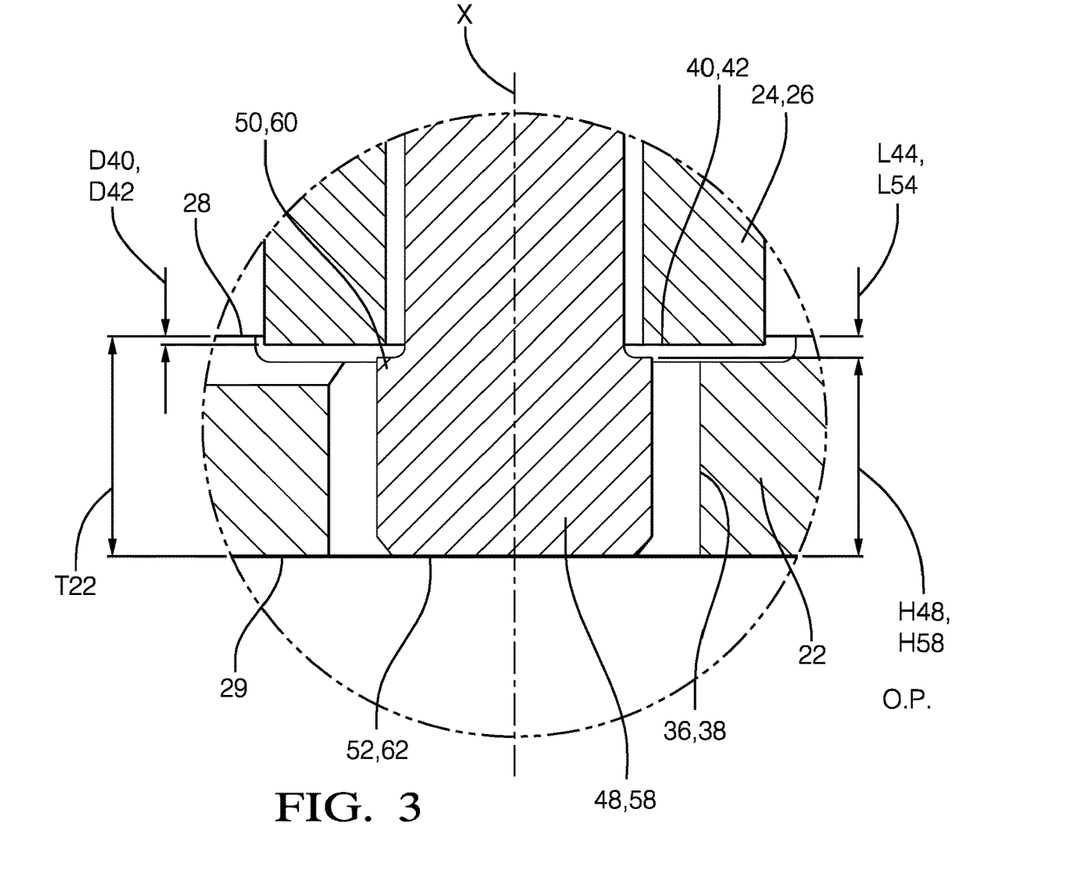
FIG. 3 is a magnified view of a part of FIG. 2.

More precisely in reference to the figures, the control valve assembly 12 has a body 18 comprising a valve guide member 20, a valve plate 22, a first sleeve 24 and a second sleeve 26. The valve plate 22 is arranged beneath the guide member 20, the upper face 28 of the plate 22 being in surface contact against the under face 30 of the guide member 20, said valve plate 22 having a thickness T22 measured between said upper face 28 and an opposed under face 29.

In an alternative not shown, the valve body 18 may be monobloc, integrating in one piece the valve guide 20 and the valve plate 22, the under face 29 being in such alternative the under face of the body 18.

In this description words such as "beneath, below, upper, under, upward . . . " are used in reference to the arbitrary top-down orientation of the figures, this in order to simplify and clarify the description without any intent to limit the scope defined by the claims.

The first valve arrangement 14 comprises a first hydraulic bore 32 and, the second valve arrangement 16 comprises a second hydraulic bore 34, both bores 32, 34 being parallel to each other and extending along a main axis X to which the under face 30 of the valve guide and the upper face 28 of the valve plate are perpendicular. The two bores 32, 34 are provided in the guide member 20 and are both opening in said under face 30. The valve plate 22 is complementary provided with a first opening 36 aligned with the first bore 32 and, with a second opening 38 aligned with the second bore 34. Opposite to the valve plate 22, on the upper side of the guide member 20, each of the bores 32, 34 open in large recesses forming chambers adapted to house magnetic armatures, not shown, cooperating with a solenoid of the actuator member. The first sleeve 24 is inserted with press-fit in the first bore 32 and similarly, the second sleeve 26 is inserted with press-fit in the second bore 34, each of the first 24 and the second 26 sleeve being a cylindrical tubular member arranged so their lower end face, respectively defining a first valve seating face 40 and a second valve seating face 42, is flush with the under face 30 of the guide member. The actual first distance D40 from said first valve seating face 40 to the under face 30 and, the actual second distance D42 from said second valve seating face 42 to the under face 30 are within a range of few micrometers, said distances D40, D42 being counted positive when the sleeve is slightly recessed inside the bore and negative when the sleeve protrudes outside.

The first valve arrangement 14 further comprises a first valve spool 44 guided in the first bore 32 and similarly, the second valve arrangement 16 further comprises with a second valve spool 54 guided in the second bore 34.

The first valve spool 44 has a thin and elongated core 46 enlarging at an end into a larger head member 48, a shoulder face 50 joining the core 46 to the head member 48 and defining said first seat face. The core 46 is guided in the first bore 32 and it extends through the first sleeve 24 while the head member 48 protrudes outside of the first bore 32 and of the sleeve 24, inside the first opening 36 of the valve plate. The head member 48 has a height H48 axially X extending from said shoulder face 50 to a distant transverse end face 52, said height H48 being smaller than the thickness T22 of the valve plate 22. Opposite to the head 48, the first spool 44 upwardly extends in the large recess and a first magnetic armature, not shown, is fixed to said part of the spool.

In operation, the injector 10 is assembled so, an upper face of the nozzle assembly is pressed in surface contact against the under face 29 of the valve plate closing, at least partially, the first and second openings 36, 38 of the valve plate. The shoulder face 50 of the first spool 44 cooperates with the first seating face 40 of the first sleeve as said first spool 44 axially slides between an open position OP and a closed position CP. In open position OP, the shoulder face 50 is lifted away from the first seating face 40 and the end face 52 of the head abuts said upper face of the nozzle so, said end face 52 lies in exact flush continuity with the under face 29 of the valve plate. In closed position CP the shoulder face 50 is in sealing contact against the first valve seating face 40 and, the end face 52 of the head is recessed inside the first opening 36 away from the upper face of the nozzle.

Similarly, the second valve spool 54 has an elongated thin core 56 enlarging at an end into a larger head member 58, a shoulder face 60 joining the core 56 to the head member 58 and defining said second seat face. The core 56 is guided in the second bore 34 and it extends through the second sleeve 26 while the head member 58 protrudes outside of the second bore 34 and of the second sleeve 26, inside the second opening 38 of the valve plate. The head member 58 has a height H58 axially X extending from said shoulder face 60 to a distant transverse end face 62, said height H58 being smaller than the thickness T22 of the valve plate 22. Opposite to the head 58, the second spool 54 upwardly extends in the large recess and a second magnetic armature, not shown, is fixed to said part of the spool.

Similarly to the operation of the first valve arrangement 14, the operation of the second valve arrangement 16 requires the shoulder face 60 of the second spool 54 and the second seating face 42 of the second sleeve to cooperate together as said second spool 54 axially slides in the body 18 between an open position OP and a closed position CP. In said open position OP, the shoulder face 60 is lifted away from the second seating face 42 and the end face 62 of the head abuts the upper face of the nozzle so, said end face 62 lies in exact flush continuity with the under face 29 of the valve plate. In closed position CP the shoulder face 60 is in sealing contact against the second valve seating face 42 and the end face 62 of the head is recessed inside the second opening 38 away from the upper face of the nozzle.

As particularly detailed on FIG. 3, the maximum lift L44, L54 of any of the valve spool is the difference between the available distance, being the thickness T22 of the valve plate plus, or minus, the distance D40, D42 from the seating face to the valve guide under face 30, and the height H48, H58 of the head member, this being calculated as per the following formulas:

$$L44 = (T22 + D40) - H48 \text{ for the first valve arrangement 14 and,}$$

$$L54 = (T22 + D42) - H58 \text{ for the second valve arrangement 16.}$$

In each formula, as already mentioned, said distances D40, D42 are counted positive when the sleeve is slightly recessed inside the bore because increasing the available lift distance and, being counted negative when the sleeve protrudes outside the bore thus decreasing the available distance.

Although the first 44 and second 54 valve spool are manufactured as per the same drawing and the same process, the respective height H48, H58 of the first 48 and second 58 head members differ within a dimensional tolerance of few microns. The thickness T22 of the valve plate 22 is also made within a tight manufacturing tolerance and, although said thickness T22 is identical for both valve arrangement 14, 16, the respective maximum lift L44, L54 may differ from each other and each one is adjusted by tuning the distances D40, D42 from the seating face to the under face 30 of the valve guide as per the formulas:

$$D40 = L44 + H48 - T22 \text{ for the first valve arrangement 14 and,}$$

$$D42 = L54 + H58 - T22 \text{ for the second valve arrangement 16.}$$

The invention described in the context of a control valve assembly provided with two valve arrangements is of course derivable in the more simple case of a control valve assembly just having one valve arrangement. In such case the maximum lift of the single valve spool is adjusted by precisely tuning the axial position of one sleeve in a hydraulic bore.

Figure 4:
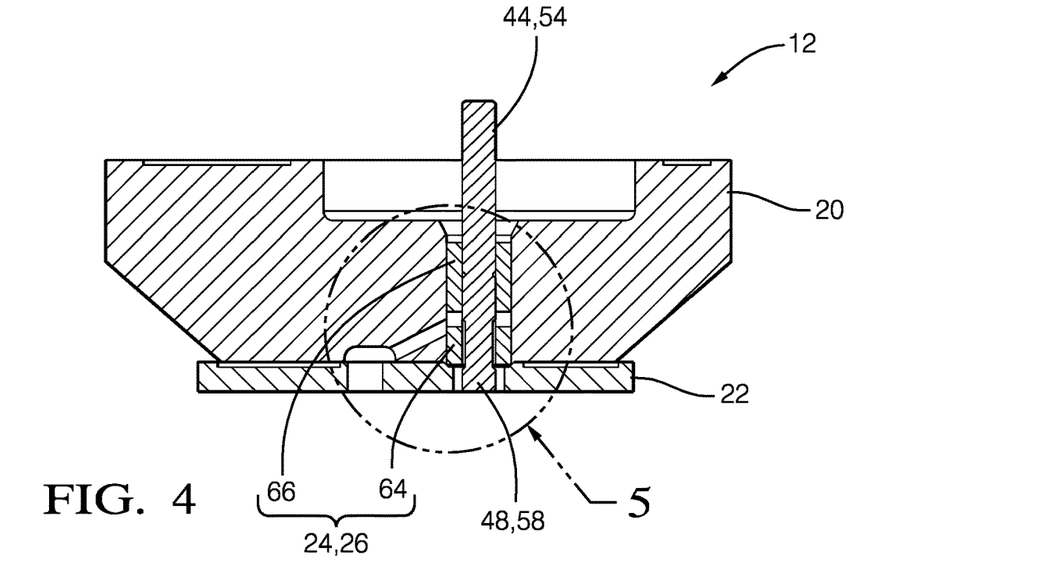
FIG. 4 is another embodiment of a control valve as per the invention.
Figure 5:
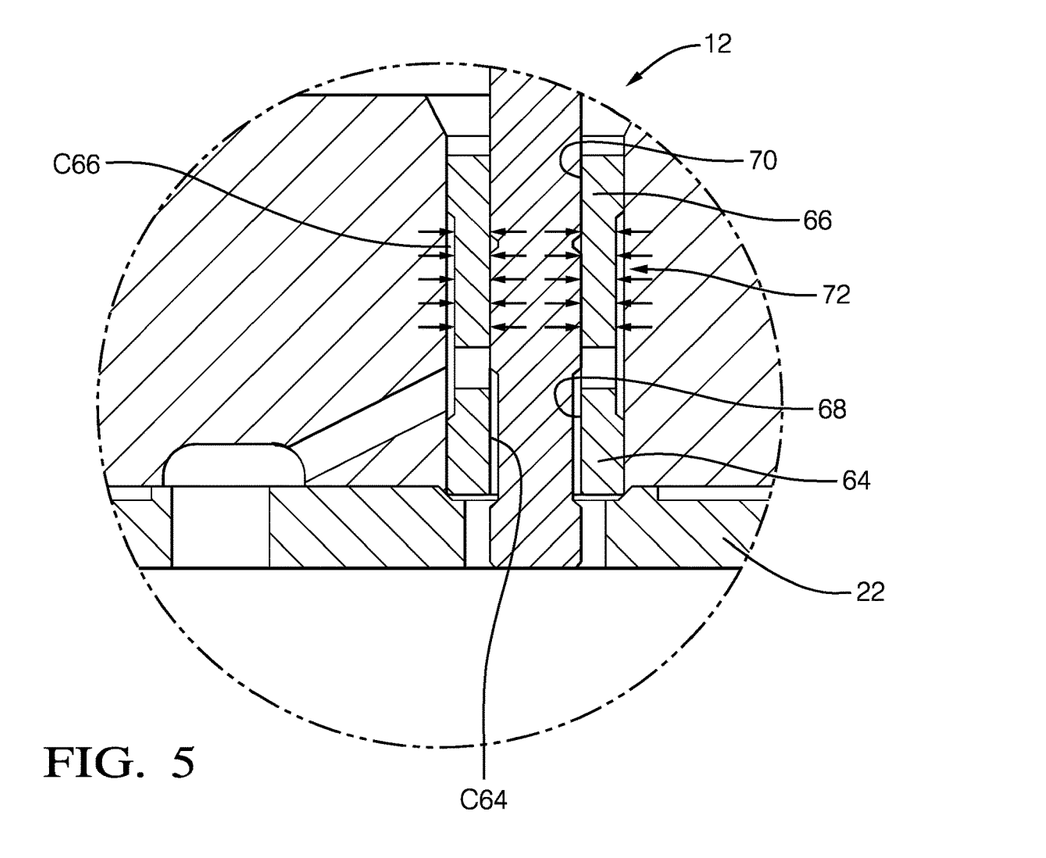
FIG. 5 is a magnified portion of FIG. 4.

Another alternative shown FIGS. 4 and 5 presents the first valve arrangement 14 only, the same applying to the second arrangement 16. The first sleeve 24 integrally comprises a seating portion 64 and a guiding portion 66, the seating portion 64, drawn at the bottom of the figure, defining the seating face 40 and, the guiding portion 66, drawn above, entirely lying inside the first hydraulic bore 32. Said first sleeve 24 defines an inner clearance C64 between the first spool 44 and the inner face 68 of said seating portion 64 and, an outer annular clearance C66 between the outer face of the guiding portion 66 and the first bore 32. The first spool 44 being axially guided by the inner face 70 of the guiding portion 66. Thanks to this sleeve arrangement, dilation of the stem bore 70 is prevented since equal pressure is acting on both sides of the sleeve guiding portion 66, then dilation of the bore is minimised as the net radial force is balanced.

Thanks to the individual positioning of the sleeves 24, 26 in the valve guide 20, the lift of the spool is individually tuned in following the steps of a method 100, which in a first stage is detailed considering a control valve assembly 12 having an integral mono-bloc body and a single valve arrangement. The steps of said method 100 are as follow:

110) providing a valve body 18 provided with a hydraulic bore 32 defining guiding portion opening in a larger recess, said opening defining a valve seating face 40;

112) providing a valve spool 44 having a head member 48 joining a core 46 via a shoulder face 50;

114) providing a sleeve 24 defining a valve seating face 40, the sleeve 24 being adapted to be inserted in said bore 32;

120) engaging and inserting with press fit said sleeve 24 in said bore 32 so that the seating face 40 is in close vicinity to the opening of the guiding portion in said larger recess;

130) arranging the valve spool 44 so its core 46 extends in the sleeve 24 and its head member 48 remains outside the sleeve in said larger recess, the shoulder face 50 being able to cooperate with the valve seating face 40;

140) adjusting the position of the sleeve 24 to the desired maximum lift L44 of the spool.

In the more general case of a non-integral control valve body 18 comprising a valve guide member 20 and a valve plate 22, the above providing 110 and engaging 120 steps are adapted:

110) providing the valve guide member 20 provided with a hydraulic bore 32 and, a valve plate 22 provided with an opening 36 complementary aligned to the bore 32;

120) engaging and inserting with press fit said sleeve 24 in said bore 32 so that the seating face 40 is in close vicinity to the under face 30 of the valve guide member 20;

After said engaging step 120 once the sleeve is press-fitted in the bore, the method 100 further comprises:

124) surfacing together the valve guide under face 30 and the sleeve 24 so that the bottom end of said sleeve defining the seating face 40 is exactly flush in surface continuity with the valve guide under face 30. Said surfacing 124 can for instance be a grinding operation.

Moreover, prior to adjusting 140 the position of the sleeve 24 the following measures should be made:

111) measuring the thickness T22 of the valve plate, this measure being done after providing 110 said valve plate and;

113) measuring the height H48 of the spool head, this measure being done between providing 112 the spool and the arranging 130 step.

In the alternative of an integral mono-bloc body, the thickness T22 of the valve plate corresponds to the depth of the larger recess in which opens the bore. In any case, the spool is chosen so the height H48 of its ahead is smaller than the thickness T22 of the plate or the depth of the recess.

Once said dimensions T22, H48 are measured and known, adjusting 140 the position of the sleeve is performed with the following steps:

142) selecting the maximum lift L44 of the spool;

144) fine positioning the sleeve 24 in the bore 32 in order to offset the valve seating face 40 from the guide member under face 30 by a distance D40 calculated by D40=L44+H48−T22. Said fine positioning step 144 may consist in pushing the sleeve outwardly so it protrudes by said distance D40 outside the bore or, in pushing inwardly should the seating face be recessed relative the guide under face 30. It could finally consist not moving the sleeve at all, should the initial position be correct. The initial push could be completed by use of a servo press with the possible addition of a piezo element for finer adjustment.

The above method steps are detailed in the context of a control valve assembly provided with a single valve arrangement, the numeral references being those of the "first" valve arrangement previously described, the adjective "first" not being repeated since, in that simple context there is no "second".

In a more general case of a control valve assembly provided with two valve arrangements 14, 16, as previously described, the maximum lift of each of the spool is individually adjusted thanks to a similar method here below detailed:

110) providing the valve guide member 20 provided with two hydraulic bores 32, 34 and, a valve plate 22 provided with two openings 36, 38 complementary aligned to said bores 32, 34;

111) measuring the thickness T22 of the valve plate, this measure being performed after providing 110 said valve plate;

112) providing two valve spool 44, 54, each having a head member 48, 58 joining a core 46, 56 via a shoulder face 50, 60;

113) measuring the height H48, H58 of each of the spool head, this measure being performed after the providing step 112.

114) providing two sleeves 24, 26, each defining a valve seating face 40 42, the sleeves 24, 26 being adapted to be inserted in one of the bores 32, 34;

120) engaging and inserting with press-fit the sleeves 24, 26 in the bores 32, 34 so that the seating faces 40, 42 are in close vicinity to the under face 30 of the valve guide member;

124) surfacing together the valve guide under face 30 and the two sleeves 24, 26 so that bottom end of said sleeves, each defining the seating faces 40, 42, are exactly flush in surface continuity with the valve guide under face 30. Said surfacing 124 can for instance be a grinding operation.

140) adjusting the position of the sleeve in the bore to the desired maximum lift of the spool, by performing the following steps:

142) selecting the maximum lift L44, L54 of each of the spool;

144) fine positioning each sleeve 24, 26 in order to offset the valve seating face from the guide member under face 30 by distances:

$D40=L44+H48-T22$ for the first sleeve and, $D42=L54+H58-T22$ for the second sleeve.

Said fine positioning step 144 may consist in pushing the sleeves outwardly so it protrudes by said distance D40, D42 outside the bore or, in pushing inwardly should the seating face be recessed relative the guide under face. It could finally consist not moving a sleeve at all, should the initial position be correct.

In the context of said valve assembly provided with two valve arrangements, the lifts L44, L54 being independently tuned, may be selected to differ from each other, one sleeve being pushed inwardly while the other is pushed outwardly.

In further alternatives, a control valve assembly provided with more than two valve arrangements can similarly benefit for the invention by having, in each valve arrangement a sleeve which position is individually adjusted.

LIST OF REFERENCES

X main axis
OP open position
CP closed position
T22 thickness of the valve plate
H48 height of the head member of the first spool
H58 height of the head member of the second spool
D40 distance first seating face/guide under face
D42 distance second seating face/guide under face
L44 maximum lift of the first valve arrangement
L54 maximum lift of the second valve arrangement
C64 inner clearance
C66 outer clearance
10 fuel injector
12 control valve assembly
14 first valve arrangement
16 second valve arrangement
18 body of the valve assembly
20 valve guide member
22 valve plate
24 first sleeve
26 second sleeve
28 upper face of the valve plate
29 under face of the valve plate
30 under face of the guide member
32 first hydraulic bore
34 second hydraulic bore
36 first opening
38 second opening
40 first seating face
42 second seating face
44 first valve spool
46 main core of the first spool
48 head member of the first spool
50 shoulder face of the first spool
52 end face of the head of the first spool
54 second valve spool
56 main core of the second spool
58 head member of the second spool
60 shoulder face of the second spool
62 end face of the head of the second spool
64 seating portion
66 guiding portion
68 inner face of the seating portion
70 inner face of the guiding portion
100 method
110 providing the valve body
111 measuring the thickness of the valve plate
112 providing the spool
113 measuring the head height
114 providing the sleeve
120 engaging the sleeve in the bore
124 surfacing
130 arranging the spool
140 adjusting the position of the sleeve
142 selecting the lift
144 fine positioning of the sleeve

The invention claimed is:

1. A control valve assembly of a fuel injector, said control valve assembly comprising:
a first valve arrangement wherein a first valve spool is guided in a first hydraulic bore provided in a body of the control valve assembly, said first valve spool being adapted to move between a closed position wherein a first shoulder face of a first head member of said first valve spool is in sealing contact against a first seating face, and a fully open position wherein a first distant end face of said first head member is in flush continuity with a first under face of the body of the control valve assembly, the shoulder face of the first valve spool being lifted away from said first seating face; and
a first tubular sleeve having a seating portion having an end face which defines said first seating face, the first tubular sleeve being fixed in the first hydraulic bore and the first valve spool extending through said first tubular sleeve,
wherein the body of the control valve assembly comprises a valve guide member provided with the first hydraulic bore and a valve plate having an upper face and an opposed under face, the upper face being arranged in surface abutment against an under face of the valve guide member, said valve plate being further provided with a through opening aligned with the first hydraulic bore, the first tubular sleeve being fixed in the valve guide member so that the first seating face lies parallel and proximate to the under face of the valve guide member, either recessed inside the first hydraulic bore or protruding in the through opening.

2. A control valve assembly as claimed in claim 1, wherein the first tubular sleeve comprises a spool guiding portion integral to the seating portion, said spool guiding portion being arranged inside the first hydraulic bore.

3. A control valve assembly as claimed in claim 2, wherein said spool guiding portion has an inner guiding face against which, in use, slides the first valve spool, and externally an outer face spaced from the first hydraulic bore by an outer annular clearance.

4. A control valve assembly as claimed in claim 1, wherein the seating portion is press-fitted in the first hydraulic bore and has an inner face defining an inner clearance with the first valve spool.

5. A control valve assembly as claimed in claim 1, further comprising a second valve arrangement, wherein a second valve spool is guided in a second hydraulic bore provided in the body of the control valve assembly, said second valve spool being adapted to move between a closed position wherein a second shoulder face of a second head member of said second valve spool is in sealing contact against a second seating face and a fully open position wherein a second distant end face of said second head member is in flush continuity with the first under face of the body of the control valve assembly, the second shoulder face of the second valve spool being lifted from said second seating face, and wherein the control valve assembly further comprises a second tubular sleeve having a second seating portion defining said second seating face, said second tubular sleeve being fixed in the second hydraulic bore, the second valve spool extending through said second tubular sleeve.

6. A control valve assembly as claimed in claim 5 wherein the second tubular sleeve has a second outer face press fitted in the second hydraulic bore and, a second inner face defining a second clearance with the second valve spool.

7. A control valve assembly as claimed in claim 5, wherein the second hydraulic bore is defined in the valve guide member and, the valve plate is provided with a second through opening aligned with the second hydraulic bore, the second tubular sleeve being press fitted in the valve guide member so that the second seating face lies parallel and proximate to the under face of the valve guide member, either recessed inside the second hydraulic bore or protruding in the second opening.

8. A control valve assembly as claimed in claim 7, wherein between the closed position and the fully open position, the second valve spool has a maximum lift (L54) calculated as per the formula:

$$L54=(T22+D42)-H58 \text{ wherein}$$

T22 is the thickness of the valve plate,
D42 is the distance from the first seating face to the under face of the valve guide and,
H58 is the height of the second head member.

9. A control valve assembly as claimed in claim 1, wherein the body of the control valve assembly comprises a valve guide member provided with the first hydraulic bore and a valve plate having an upper face and an opposed under face, the upper face being arranged in surface abutment against an under face of the valve guide member, said valve plate being further provided with a through opening aligned with the first hydraulic bore, the first tubular sleeve being fixed in the valve guide member so that the first seating face lies parallel and proximate to the under face of the valve guide member, either recessed inside the first hydraulic bore or protruding in the through opening.

10. Control valve assembly as claimed in claim 9 wherein between the closed position and the fully open position, the first valve spool has a maximum lift (L44) calculated as per the formula:

$$L44=(T22+D40)-H48 \text{ wherein}$$

T22 is the thickness of the valve plate,
D40 is an offset distance from the first seating face to the under face of the valve guide and,
H48 is the height of the first head member.

11. A fuel injector comprising:
a control valve assembly comprising:
a first valve arrangement wherein a first valve spool is guided in a first hydraulic bore provided in a body of the control valve assembly, said first valve spool being adapted to move between a closed position wherein a first shoulder face of a first head member of said first valve spool is in sealing contact against a first seating face, and a fully open position wherein a first distant end face of said first head member is in flush continuity with a first under face of the body of the control valve assembly, the shoulder face of the first valve spool being lifted away from said first seating face; and
a first tubular sleeve having a seating portion having an end face which defines said first seating face, the first tubular sleeve being fixed in the first hydraulic bore and the first valve spool extending through said first tubular sleeve,
wherein the body of the control valve assembly comprises a valve guide member provided with the first hydraulic bore and a valve plate having an upper face and an opposed under face, the upper face being arranged in surface abutment against an under face of the valve guide member, said valve plate being further provided with a through opening aligned with the first hydraulic bore, the first tubular sleeve being fixed in the valve guide member so that the first seating face lies parallel and proximate to the under face of the valve guide member, either recessed inside the first hydraulic bore or protruding in the through opening.

12. A method of manufacturing a control valve assembly having a first valve arrangement wherein a first valve spool is guided in a first hydraulic bore provided in a body of the control valve assembly, said first valve spool being adapted to move between a closed position wherein a first shoulder face of a first head member of said first valve spool is in sealing contact against a first seating face, and a fully open position wherein a first distant end face of said first head member is in flush continuity with a first under face of the body of the control valve assembly, the shoulder face of the first valve spool being lifted away from said first seating face; and a first tubular sleeve having a seating portion having an end face which defines said first seating face, the first tubular sleeve being fixed in the first hydraulic bore and the first valve spool extending through said first tubular sleeve, wherein the body of the control valve assembly comprises a valve guide member provided with the first hydraulic bore and a valve plate having an upper face and an opposed under face, the upper face being arranged in surface abutment against an under face of the valve guide member, said valve plate being further provided with a through opening aligned with the first hydraulic bore, the first tubular sleeve being fixed in the valve guide member so that the first seating face lies parallel and proximate to the under face of the valve guide member, either recessed inside the first hydraulic bore or protruding in the through opening, the method comprising the steps of:
providing the valve body defining the first hydraulic bore;
providing the first valve spool having the head member joining a first core via the first shoulder face;
providing the first tubular sleeve adapted to be inserted in said first hydraulic bore;
engaging, and inserting with press fit, said first tubular sleeve in said first hydraulic bore so that the first seating face is in close vicinity to a second under face of the valve body;
arranging the first valve spool so that the first core extends in the first tubular sleeve and the first head member is outside the first tubular sleeve, the first shoulder face being able to cooperate with the first seating face; and
adjusting the position of the first tubular sleeve to a desired first maximum lift of the first valve spool.

13. A method as claimed in claim 12, wherein the control valve assembly is provided with a second valve arrangement, wherein a second valve spool is guided in a second hydraulic bore provided in the body of the control valve assembly, said second valve spool being adapted to move between a closed position wherein a second shoulder face of a second head member of said second valve spool is in sealing contact against a second seating face and a fully open position wherein a second distant end face of said second head member is in flush continuity with the first under face of the body of the control valve assembly, the second shoulder face of the second valve spool being lifted from said second seating face, and wherein the control valve assembly further comprises a second tubular sleeve having a second seating portion defining said second seating face, said second tubular sleeve being fixed in the second hydraulic bore, the second valve spool extending through said second tubular sleeve, the method further comprising:

providing the second valve spool having the second head member joining a second core via the second shoulder face;

providing the second tubular sleeve adapted to be inserted in said second hydraulic bore;

engaging and inserting with press-fit said second tubular sleeve in said second hydraulic bore;

slidably engaging the second core of the second valve spool in the second tubular sleeve, the second head member protruding outside the second tubular sleeve;

adjusting the position of the second tubular sleeve in the second hydraulic bore to a desired second maximum lift of the second valve spool.

14. A method as claimed in claim 13, wherein the control valve body is provided with a valve guide member and a valve plate.

15. A method as claimed in claim 14 further comprising:
measuring the thickness of the valve plate;
measuring the height of each of the first head member and said second head member.

16. A method as claimed in claim 15, further comprising surfacing together the valve guide under face and the two sleeves so that the bottom ends of said sleeves, each defining the seating faces, are exactly flush in surface continuity with the valve guide under face.

17. A method as claimed in claim 16 wherein the surfacing is a grinding operation.

18. A method as claimed in claim 14, wherein adjusting comprises:

selecting the maximum lift possible for each of the first valve spool and the second valve spool;

fine positioning the first tubular sleeve and the second tubular sleeve in order to offset the first seating face and the second seating face from the under face of the guide member by a distance:

$D40=L44+H48-T22$ for the first sleeve and, $D42=L54+H58-T22$ for the second sleeve wherein:

D40 and D42 are the axial offset distance from the valve guide member under face to the first, respectively the second, seating face, H48 and H58 are the head height of the first and second valve spool, and T22 is the thickness of the valve plate.

* * * * *